United States Patent [19]

von Wartburg

[11] 4,246,033

[45] Jan. 20, 1981

[54] ARRANGEMENT FOR APPLYING WRITTEN OR DRAWN INFORMATION ONTO IMAGE CARRIERS FOR OVERHEAD PROJECTION

[75] Inventor: Rene von Wartburg, Rhine, Switzerland

[73] Assignee: Pelikan A.G., Switzerland

[21] Appl. No.: 847,114

[22] Filed: Oct. 31, 1977

[30] Foreign Application Priority Data

Nov. 23, 1976 [CH] Switzerland ........................ 14716/76

[51] Int. Cl.[3] ........................ C09D 11/00; C09D 11/04

[52] U.S. Cl. ........................................ 106/23; 106/21; 106/22; 106/24; 401/196

[58] Field of Search .................... 353/44, 120; 106/23, 106/24, 22, 21; 260/327 S

[56] References Cited

U.S. PATENT DOCUMENTS

| | | | |
|---|---|---|---|
| 3,501,838 | 3/1970 | Agliata et al. | 353/44 |
| 3,672,842 | 6/1972 | Florin | 106/22 |

*Primary Examiner*—J. Ziegler

*Attorney, Agent, or Firm*—Neil F. Markva

[57] ABSTRACT

Arrangement for applying written or drawn information onto image carriers for overhead projectors, characterized by an image carrier in film or plate form which comprises at least one colored compound, as well as a writing or drawing marker. The writing or drawing fluid of the marker contains at least one colorless compound which reacts with the colored compound to produce a color change.

7 Claims, No Drawings

ARRANGEMENT FOR APPLYING WRITTEN OR DRAWN INFORMATION ONTO IMAGE CARRIERS FOR OVERHEAD PROJECTION

BACKGROUND OF THE INVENTION

The overhead projector is a didactical appliance which has found widespread application during the last decades. As opposed to a normal slide projector, the light in the overhead projector runs vertically and is not diverted into the horizontal until it is near the projection objective. The plane of the slide is, therefore, horizontal and is easily accessible. The image reversal by the deviating mirror results in the fact that a slide, which gives a true-to-side image on the projecting wall, is also true-to-side as seen from above. Since additionally, a very large slide format compared to normal slide projection is chosen (mostly between 25×25 cm and 30×30 cm), it is easy to draw or write on the slide during projection (hence the name "working projector" which is sometimes given to this unit). The size of the slide allows an optical construction which uses the light output of the projection lamp so well that the projected image is sufficiently bright with lamps of 250 to 500 watts so that complete darkening of the room is no longer necessary. The listeners can thereby make notes during the lecture. A further advantage of the overhead projector is the fact that the person working with the unit looks in the direction of the listeners (which is not normally the case when writing on a black-board or when projecting normal slides). He can, therefore, watch the faces of the listeners and adapt the lecture to their reactions.

Usually, clear plastic films (mostly made of cellulose acetate) are used as image carriers for the slides which are written or drawn upon during the lecture. They are written on with black or colored felt-tipped pens or similar writing and drawing markers. This procedure has several disadvantages:

- the writing or drawing marker is filled with a black or colored solution. When marking with them it can therefore easily happen that hands, clothing as well as the slides are smeared with this.
- the legibility of a black or colored marking on the white background of the projected image is not especially good. Negative writing i.e. light marking on a dark background is more easily legible. The discernableness is even better if a color contrast is given in addition to the lightness contrast i.e. the light and dark parts of the image are not in the same color shade. Statistical tests have shown that the best legibility is achieved with light yellow marking on a dark blue background.

SUMMARY OF THE INVENTION

It is the object of the present invention to eliminate the disadvantages mentioned of the previously used image carriers and writing and drawings markers. According to the present invention this is achieved in that the film is dyed with a colored chemical compound, whereby this compound so reacts with a further colorless compound contained in the writing or drawing marker that a compound of a different color is formed. Among the enormous number of chemical reactions which satisfy the above mentioned conditions, all those by which the colorless compound comprised in the marker could be dangerous for hands or clothes are ruled out for practical application. A group of reactions which are especially suitable in the present invention is the reaction of indicator dyes with acids or bases provided that the color change occurs in such a pH-range that corroding acids or alkalis do not have to be used. The reversible nature of these reactions additionally allows the marking to be deleted with a solution of a respective pH-value.

DETAILED DESCRIPTION

It has now been found that indicator dyes of the sulphonphthalein series having the formula:

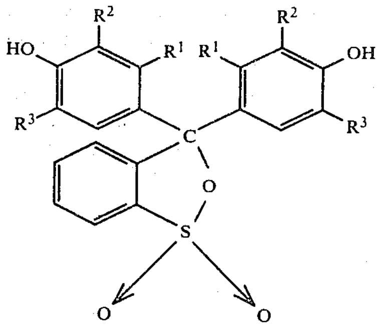

wherein $R^1$ is hydrogen or methyl, $R^2$ is hydrogen, methyl, bis-(carboxymethyl)-aminomethyl, chlorine or bromine and $R^3$ is hydrogen, methyl, isopropyl, bis-(carboxymethyl)aminomethyl, chlorine or bromine, satisfy the required conditions. Their color in an alkaline medium is blue-green to blue-violet and yellow in an acid medium. The color change takes place in the pH-range of between 3.0 and 9.6 so that neither strong acids nor strong alkalis have to be used when employing these indicator dyes. Examples of such indicator dyes are listed in the following table.

| No. | Name | color change at pH | R' (2-position) | $R^2$ (3-position) | $R^3$ (5-position) |
|---|---|---|---|---|---|
| 1 | Bromchlorphenol Blue | 3.0–4.6 | H | Br | Cl |
| 2 | Bromcresol Green | 3.8–5.4 | $CH_3$ | Br | Br |
| 3 | Bromcresol Purple | 5.2–6.8 | H | $CH_3$ | Br |
| 4 | Bromphenol Blue | 3.0–4.6 | H | Br | Br |
| 5 | Bromthymol Blue | 6.0–7.6 | $CH_3$ | Br | $—CH(CH_3)_2$ |
| 6 | Bromxylenol Blue | 6.0–7.6 | $CH_3$ | Br | $CH_3$ |
| 7 | Methylthymol Blue | | $CH_3$ | $—CH_2—N(CH_2COOH)_2$ | $—CH(CH_3)_2$ |
| 8 | Thymol Blue | 8.0–9.6 | $CH_3$ | H | $—CH(CH_3)_2$ |
| 9 | p-Xylenol Blue | 8.0–9.6 | $CH_3$ | H | $CH_3$ |
| 10 | Xylenol Orange | | H | $CH_3$ | $—CH_2—N(CH_2COOH)_2$ |

Since the dyed film can easily come into contact with perspiration when writing, those of the dyes described whose color change occurs in a relatively low pH-range, e.g. between pH 3 and 5, are especially suitable since in the case of these dyes, the acidity of perspiration is not sufficient to cause the color change. In order to achieve an optically agreeable blue color shade, a mixture of the mentioned or of similar dyes can be used.

EXAMPLE 1

100 g photogelatine are soaked in 1 liter of water. By heating up to about 50° C. the gelatine is dissolved. 10 g bromcresol green and 5 g anhydrous soda are added to this solution. A thin layer of the solution is poured using a coating machine, onto a film of cellulose triacetate (as is used in the production of photographic films), is allowed to solidify the dried. The intensively blue colored film is marked on the overhead projector on the coated side with a felt-tipped pen, which is saturated with the following solution:

citric acid—10 g
glycerol—5 ml
water—1 liter

When marking with this solution, a color change to intensive yellow occurs.

EXAMPLE 2

Shortly before coating, 100 ml per liter solution of 40% formalin solution are added to the gelatine dye solution as in example 1, which contains bromthymol blue instead of bromcresol green. 50 ml of this solution are poured onto a level glass plate of the size 30×30 cm. After solidifying and drying, this plate can be marked on an overhead projector with a felt-tipped pen which is saturated with the following solution:

acetic acid 80%—10 ml
glycerol—5 ml
water—1 liter

When the plate is no longer required, it can be washed off with a mixture of 5 g anhydrous soda in 1 liter denatured ethanol. The original blue color is restored and the plate can be used again once it is dry.

EXAMPLE 3

A solution of cellulose xanthate, as is used in the production of cellulose films, is mixed with a mixture of 1 g bromcresol green and 1 g bromphenol blue per kg solution. This solution is poured to form films in the usual manner. These are cut into rolls of 30 cm width, and can be clamped into overhead projectors which have a holder for film rolls. When marking with a felt-tipped pen as described in example 1, a color change to yellow occurs. Since the aqueous solution completely penetrates the film, as opposed to example 1, it does not matter which side of the film is marked.

What is claimed is:

1. A combination for transmitting information with overhead projectors, said combination comprising:
   (a) a carrier including at least one color producing material which provides a first color to said carrier, and
   (b) marking means containing a colorless material which transfers to the carrier upon contact of the marking means with the carrier,
   (c) said colorless material being effective to react with said color producing material to change said first color to another color.
2. The combination as defined in claim 1 wherein the carrier includes a substrate having a film disposed thereon,
   said color producing material is located in said film.
3. The combination as defined in claim 2 wherein said color producing material is a colored compound.
4. The combination as defined in claim 3 wherein said colored compound includes an indicator dye or mixture of indicator dyes.
5. The combination as defined in claim 1 wherein the colorless material includes diluted solution of an acid or alkali.
6. The combination as defined in claim 1 wherein the color producing the material is a blue compound and
   the colorless material is effective to react with the blue compound to form a yellow color.
7. The combination as defined in claim 1 wherein the color producing material includes a dye having the formula:

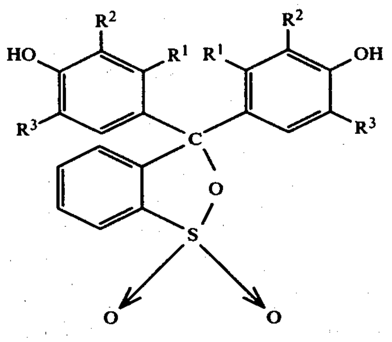

wherein $R^1$ is hydrogen or methyl, $R^2$ is hydrogen, methyl, bis-(carboxymethyl)-aminomethyl, chlorine or bromine, and $R^3$ is hydrogen, methyl, isopropyl, bis-(carboxymethyl)-aminomethyl, chlorine or bromine.

* * * * *

UNITED STATES PATENT AND TRADEMARK OFFICE

CERTIFICATE OF CORRECTION

PATENT NO. : 4,246,033

DATED : January 20, 1981

INVENTOR(S) : Rene von Wartburg

It is certified that error appears in the above-identified patent and that said Letters Patent is hereby corrected as shown below:

On the title page, Item (73) assignee should read

-- Pelikan A. G., Hannover --.

Signed and Sealed this

*Ninth* Day of *November 1982*

[SEAL]

*Attest:*

GERALD J. MOSSINGHOFF

*Attesting Officer* *Commissioner of Patents and Trademarks*

REEXAMINATION CERTIFICATE (1146th)

United States Patent [19]

[11] B1 4,246,033 von Wartburg

[45] Certificate Issued Oct. 24, 1989

[54] ARRANGEMENT FOR APPLYING WRITTEN OR DRAWN INFORMATION ONTO IMAGE CARRIERS FOR OVERHEAD PROJECTION

[75] Inventor: René von Wartburg, Rhine, Switzerland

[73] Assignee: Pelikan AG, Hanover, Fed. Rep. of Germany

Reexamination Request:
No. 90/001,467, Mar. 2, 1988

Reexamination Certificate for:

| | |
|---|---|
| Patent No.: | **4,246,033** |
| Issued: | **Jan. 20, 1981** |
| Appl. No.: | **847,114** |
| Filed: | **Oct. 31, 1977** |

Certificate of Correction issued Nov. 9, 1982.

[30] Foreign Application Priority Data

Nov. 23, 1976 [CH] Switzerland ........................ 14716/76

[51] Int. Cl.$^4$ ...................... C09D 11/00; C09D 11/04; C09D 11/16

[52] U.S. Cl. ........................................ 106/23; 106/21; 106/22; 106/24; 353/15; 353/44; 353/120; 353/DIG. 3; 549/33

[58] Field of Search ............... 106/21, 22, 23; 353/44, 353/120, 15, DIG. 3; 549/33

[56] References Cited

U.S. PATENT DOCUMENTS

| | | | |
|---|---|---|---|
| 2,202,529 | 5/1940 | Lengel | 101/211 |
| 3,963,338 | 6/1976 | Altman et al. | 353/120 |

FOREIGN PATENT DOCUMENTS 2426058 12/1975 Fed. Rep. of Germany .

OTHER PUBLICATIONS

"Römpps Chemie-Lexikon"; W. Keller & Co., Stuttgart/1975, excerpt submitted, no page numbers.

*Primary Examiner*—Jacob Ziegler

[57] ABSTRACT

Arrangement for applying written or drawn information onto image carriers for overhead projectors, characterized by an image carrier in film or plate form which comprises at least one colored compound, as well as a writing or drawing marker. The writing or drawing fluid of the marker contains at least one colorless compound which reacts with the colored compound to produce a color change.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the tent, but has been deleted and is no louger a part of the tent; matter printed in italics indicates additions made the patent.

S A RESULT OF REEXAMINATION, IT HAS BEEN DETERMINED THAT:

Claims 1-7 are cancelled.

New claim 8 is added and determined to be patent-le. ps

*8. A combination for transmitting information with erhead projectors, said combination comprising:*

*(a) a carrier including a clear plastic film substrate and a film thereon containing at least one color producing material which provides a blue color to said carrier, the color producing material including a dye having the formula:*

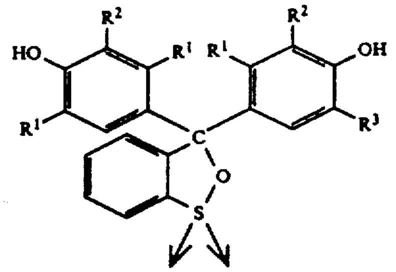

*wherein $R^1$ is hydrogen or methyl, $R^2$ is hydrogen, methyl, bis-(carboxymethyl)-aminomethyl chlorine, or bromine, and $R^3$ is hydrogen, methyl, isopropyl, bis(carboxymethyl)-aminomethyl, chlorine, or bromine, and*

*(b) marking means containing a colorless material in the form of dilute acid or alkali which transfers to the carrier upon contact of the marking means with the carrier,*

*(c) said colorless material being effective to react with said color producing material to change said blue color to a yellow color.*

* * * * *